United States Patent
De Albuquerque et al.

(10) Patent No.: US 10,643,642 B2
(45) Date of Patent: *May 5, 2020

(54) APPARATUS AND METHOD FOR WRITING TO MAGNETIC MEDIA USING AN AC BIAS CURRENT TO ENHANCE THE WRITE FIELD

(71) Applicant: Western Digital Technologies, Inc., San Jose, CA (US)

(72) Inventors: Gonçalo Marcos Baião De Albuquerque, San Jose, CA (US); Yunfei Ding, Fremont, CA (US); Alexander Goncharov, Morgan Hill, CA (US); Kuok San Ho, Redwood City, CA (US); Daniele Mauri, San Jose, CA (US); Goran Mihajlovic, San Jose, CA (US); Suping Song, Fremont, CA (US); Petrus Antonius Van Der Heijden, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,064

(22) Filed: Jul. 1, 2019

(65) Prior Publication Data
US 2019/0325902 A1    Oct. 24, 2019

Related U.S. Application Data

(63) Continuation of application No. 15/919,025, filed on Mar. 12, 2018, now Pat. No. 10,388,305, which is a
(Continued)

(51) Int. Cl.
*G11B 5/09*    (2006.01)
*G11B 5/31*    (2006.01)

(52) U.S. Cl.
CPC .............. *G11B 5/09* (2013.01); *G11B 5/3146* (2013.01)

(58) Field of Classification Search
None
See application file for complete search history.

(56) References Cited

U.S. PATENT DOCUMENTS 6,201,653 B1    3/2001    Contreras et al.
6,614,554 B1 *  9/2003    Yokoi .................... B41J 19/202
                                                            347/11
(Continued)

FOREIGN PATENT DOCUMENTS

CN    104835510 B    11/2017
JP    2013047999 A    3/2013
(Continued)

OTHER PUBLICATIONS

Center for Memory and Recording Research, "Research Review & Advisory Council Meeting Program," Oct. 8-9, 2015.
(Continued)

*Primary Examiner* — Peter Vincent Agustin
(74) *Attorney, Agent, or Firm* — Jacobsen IP Law; Krista S. Jacobsen

(57) ABSTRACT

An apparatus comprises a main pole, a trailing shield, a write-field-enhancing structure, a write coil, a write current control circuit configured to supply a write current to the write coil to record a bit to a magnetic medium, and a driving current control circuit configured to supply a driving current to the write-field-enhancing structure, wherein the driving current comprises a driving pulse, and wherein the driving current comprises an AC component with a duty cycle selected based at least in part on a power constraint. A method of writing to a magnetic medium comprises supplying a write current to a write coil of a magnetic write head, and supplying a driving current to a free layer disposed in a
(Continued)

write gap between a main pole and a trailing shield, wherein the driving current comprises an AC component with a duty cycle based at least in part on a power constraint.

23 Claims, 11 Drawing Sheets

Related U.S. Application Data continuation of application No. 15/395,111, filed on Dec. 30, 2016.

(56) References Cited

U.S. PATENT DOCUMENTS

| | | | |
|---|---|---|---|
| 6,813,115 B2 | 11/2004 | Van der Heijden et al. | |
| 7,310,197 B2 | 12/2007 | Baumgart et al. | |
| 7,397,633 B2 | 7/2008 | Xue et al. | |
| 7,538,977 B2 | 5/2009 | Gider et al. | |
| 7,724,469 B2 | 5/2010 | Gao et al. | |
| 7,869,160 B1 | 1/2011 | Pan et al. | |
| 7,982,996 B2 | 7/2011 | Smith et al. | |
| 8,049,984 B2 | 11/2011 | Contreras et al. | |
| 8,116,031 B2 | 2/2012 | Alex et al. | |
| 8,174,798 B2 | 5/2012 | Nagasawa et al. | |
| 8,179,633 B2 | 5/2012 | Contreras et al. | |
| 8,203,192 B2 | 6/2012 | Gao et al. | |
| 8,208,219 B2 | 6/2012 | Zhang et al. | |
| 8,238,059 B1 | 8/2012 | Tang et al. | |
| 8,274,811 B2 | 9/2012 | Zhang et al. | |
| 8,339,736 B2 | 12/2012 | Gao et al. | |
| 8,351,155 B2 | 1/2013 | Contreras et al. | |
| 8,400,734 B2 | 3/2013 | Yamada et al. | |
| 8,422,159 B2 | 4/2013 | Gao et al. | |
| 8,446,690 B2 | 5/2013 | Alex et al. | |
| 8,467,149 B2 | 6/2013 | Takeo et al. | |
| 8,472,135 B1 | 6/2013 | Kusukawa et al. | |
| 8,472,140 B2 | 6/2013 | Yamada et al. | |
| 8,537,497 B2 | 9/2013 | Nagasaka et al. | |
| 8,553,346 B2 | 10/2013 | Braganca et al. | |
| 8,564,903 B2 | 10/2013 | Min et al. | |
| 8,570,684 B1 | 10/2013 | Contreras et al. | |
| 8,582,240 B1 | 11/2013 | Chen et al. | |
| 8,599,506 B2 | 12/2013 | Contreras et al. | |
| 8,654,465 B2 | 2/2014 | Braganca et al. | |
| 8,755,153 B2 | 6/2014 | Kudo et al. | |
| 8,797,693 B1 | 8/2014 | Furukawa et al. | |
| 8,824,104 B1 | 9/2014 | Koui et al. | |
| 8,879,205 B2 | 11/2014 | Shiimoto et al. | |
| 8,896,973 B2 | 11/2014 | Nagasawa et al. | |
| 8,917,465 B1 | 12/2014 | Contreras et al. | |
| 8,953,273 B1 | 2/2015 | Funayama | |
| 9,001,444 B1 | 4/2015 | Contreras et al. | |
| 9,007,722 B2 | 4/2015 | Shimizu et al. | |
| 9,007,723 B1 | 4/2015 | Igarashi et al. | |
| 9,042,051 B2 | 5/2015 | Zeng et al. | |
| 9,047,888 B2 | 6/2015 | Katada et al. | |
| 9,064,508 B1 | 6/2015 | Shiimoto et al. | |
| 9,099,128 B1 | 8/2015 | Contreras et al. | |
| 9,142,227 B1 | 9/2015 | Etoh et al. | |
| 9,202,528 B2 | 12/2015 | Furukawa et al. | |
| 9,230,569 B1 | 1/2016 | Shimoto et al. | |
| 9,230,571 B1 | 1/2016 | Chen et al. | |
| 9,275,672 B2 | 3/2016 | Shiroishi et al. | |
| 9,318,131 B2 | 4/2016 | Tian et al. | |
| 9,330,691 B1 | 5/2016 | Narita et al. | |
| 9,355,657 B1 | 5/2016 | Aoyama et al. | |
| 9,355,668 B2 | 5/2016 | Nishida et al. | |
| 9,368,135 B2 | 6/2016 | Gao | |
| 9,378,759 B2 | 6/2016 | Nagasaka et al. | |
| 9,390,734 B2 | 7/2016 | Gao | |
| 9,679,587 B2 | 6/2017 | Taguchi | |
| 9,881,637 B1 | 1/2018 | Wilson et al. | |
| 10,121,497 B1 | 11/2018 | Takahashi et al. | |
| 10,135,392 B2 | 11/2018 | Wei et al. | |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,388,305 B1* | 8/2019 | De Albuquerque | G11B 5/3146 |
| 10,424,323 B1* | 9/2019 | Contreras | G11B 5/02 |
| 2002/0130658 A1* | 9/2002 | Abe | G01Q 10/06 324/210 |
| 2006/0067006 A1 | 3/2006 | Takagishi et al. | |
| 2007/0195453 A1 | 8/2007 | Kameda et al. | |
| 2008/0212239 A1* | 9/2008 | Kawato | G11B 5/11 360/319 |
| 2008/0304176 A1 | 12/2008 | Takagishi et al. | |
| 2009/0059423 A1 | 3/2009 | Yamada et al. | |
| 2009/0080106 A1 | 3/2009 | Shimizu et al. | |
| 2009/0310244 A1 | 12/2009 | Shimazawa et al. | |
| 2010/0091623 A1 | 4/2010 | Tsuyama | |
| 2011/0134561 A1* | 6/2011 | Smith | G11B 5/1278 360/59 |
| 2011/0216435 A1 | 9/2011 | Shiimoto et al. | |
| 2011/0279921 A1 | 11/2011 | Zhang et al. | |
| 2011/0310510 A1 | 12/2011 | Anagawa et al. | |
| 2012/0002331 A1 | 1/2012 | Oikawa et al. | |
| 2012/0113542 A1 | 5/2012 | Igarashi et al. | |
| 2012/0224283 A1 | 9/2012 | Sato et al. | |
| 2012/0243127 A1 | 9/2012 | Iwasaki et al. | |
| 2012/0275061 A1 | 11/2012 | Takagishi et al. | |
| 2013/0235485 A1 | 9/2013 | Livshitz et al. | |
| 2013/0250456 A1 | 9/2013 | Yamada et al. | |
| 2013/0258514 A1* | 10/2013 | Kobayashi | G11B 5/314 360/46 |
| 2014/0063648 A1 | 3/2014 | Shiroishi et al. | |
| 2014/0104724 A1 | 4/2014 | Shiroishi et al. | |
| 2014/0139952 A1 | 5/2014 | Takeo et al. | |
| 2014/0146420 A1 | 5/2014 | Shimizu et al. | |
| 2014/0168824 A1* | 6/2014 | Ju | G11B 5/3906 360/324.11 |
| 2014/0177092 A1 | 6/2014 | Katada et al. | |
| 2014/0177100 A1 | 6/2014 | Sugiyama et al. | |
| 2014/0268428 A1* | 9/2014 | Dimitrov | G11B 5/3912 360/313 |
| 2014/0269235 A1* | 9/2014 | Gong | G01R 33/0076 369/13.24 |
| 2015/0002963 A1 | 1/2015 | Tian et al. | |
| 2015/0092292 A1 | 4/2015 | Furukawa et al. | |
| 2016/0027455 A1 | 1/2016 | Kudo et al. | |
| 2016/0027456 A1 | 1/2016 | Gao | |
| 2016/0035373 A1 | 2/2016 | Takagishi et al. | |
| 2016/0035375 A1 | 2/2016 | Gao | |
| 2016/0055866 A1* | 2/2016 | Le | G11B 5/39 360/75 |
| 2016/0180906 A1 | 6/2016 | Kudo et al. | |
| 2017/0236537 A1 | 8/2017 | Murakami et al. | |
| 2018/0252780 A1 | 9/2018 | Iwasaki et al. | |
| 2018/0261241 A1 | 9/2018 | Narita et al. | |
| 2018/0268848 A1 | 9/2018 | Narita et al. | |
| 2019/0088274 A1 | 3/2019 | Narita et al. | |
| 2019/0088275 A1 | 3/2019 | Narita et al. | |

FOREIGN PATENT DOCUMENTS

| | | |
|---|---|---|
| JP | 2013251042 A | 12/2013 |
| JP | 2014130672 A | 7/2014 |
| JP | 2015011745 A | 1/2015 |
| JP | 2014081981 B | 2/2017 |
| JP | 2018146314 A | 9/2018 |
| JP | 2018147540 A | 9/2018 |
| JP | 2018158709 A | 10/2018 |
| WO | 2015126326 A1 | 8/2015 |

OTHER PUBLICATIONS

Mike Mallary, et al., "Head and Media Challenges for 3 Tb/in^2 Microwave-Assisted Magnetic Recording," IEEE Transactions on Magnetics, vol. 5, Iss. 7, Jul. 2014.

Takuto Katayama, et al., "Micromagnetic model analysis of integrated single-pole-type head with tilted spin-torque oscillator for

(56) References Cited

OTHER PUBLICATIONS high-frequency microwave-assisted magnetic recording," J. Appl. Phys. 117, 17C503 (2015).

Yasushi Kanai, et al., "Micromagnetic Simulation of Spin-Torque Oscillator for Microwave-Assisted Magnetic Recording—Interaction Between Write Head and STO and Optimum Injected Current," IEEE Transactions on Magnetics, vol. 52, Issue 7, Jul. 2016.

* cited by examiner

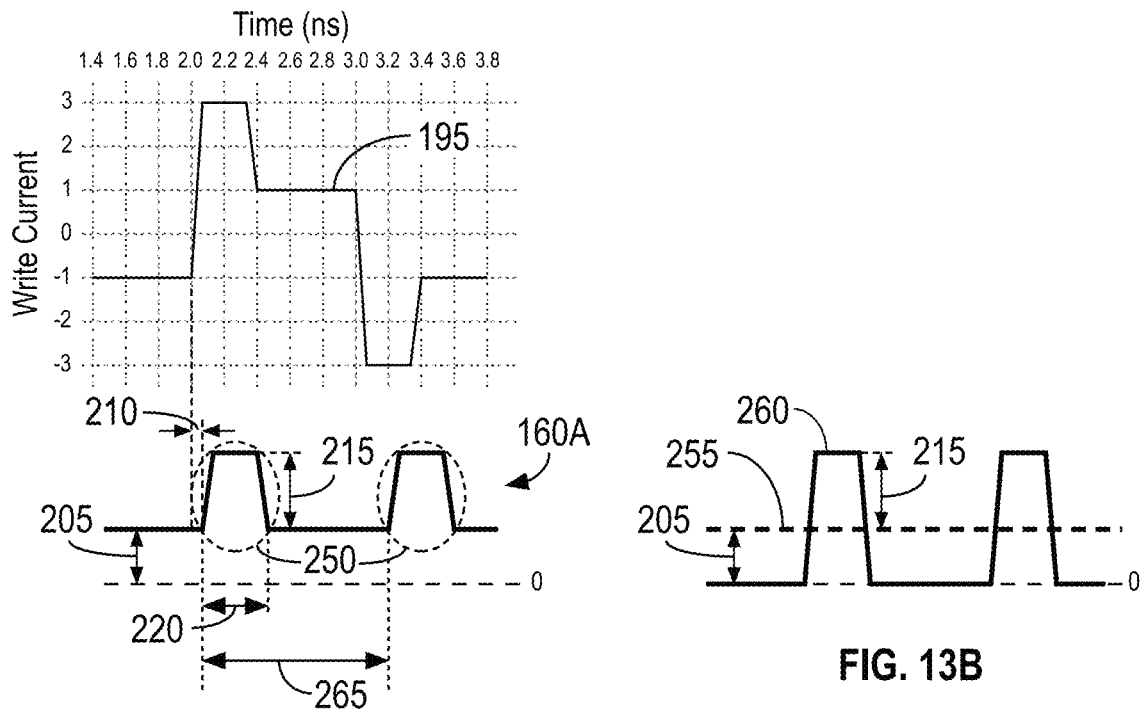
FIG. 13A
FIG. 13B
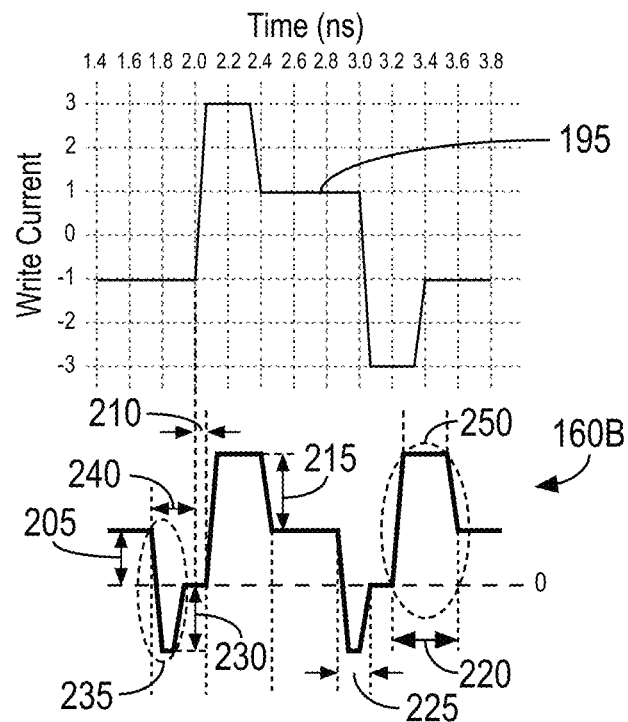
FIG. 14

APPARATUS AND METHOD FOR WRITING TO MAGNETIC MEDIA USING AN AC BIAS CURRENT TO ENHANCE THE WRITE FIELD

CROSS-REFERENCE TO RELATED APPLICATIONS

This application is a continuation of, and hereby incorporates by reference the entirety of, U.S. application Ser. No. 15/919,025, filed on Mar. 12, 2018 and entitled "APPARATUS AND METHOD FOR WRITING TO MAGNETIC MEDIA USING AN AC BIAS CURRENT TO ENHANCE THE WRITE FIELD," which is a continuation of U.S. application Ser. No. 15/395,111, filed on Dec. 30, 2016 and entitled "APPARATUS AND METHOD FOR WRITING TO MAGNETIC MEDIA USING AN AC BIAS CURRENT TO ENHANCE THE WRITE FIELD." This application hereby incorporates by reference the entirety of U.S. nonprovisional application Ser. No. 15/918,060, filed on Mar. 12, 2018 and entitled "HIGH-BANDWIDTH STO BIAS ARCHITECTURE WITH INTEGRATED SLIDER VOLTAGE POTENTIAL CONTROL."

BACKGROUND

Magnetic storage systems, such as hard disk drives, are used to store large amounts of information. A magnetic head in a magnetic storage system typically includes a read/write transducer for retrieving and storing magnetically encoded information on a magnetic recording media, such as a disk.

The ability to increase the storage capacity in magnetic recording is an ongoing concern. As the amount of information to be stored on the magnetic recording media continues to increase, demands for higher-density recording also continue to increase. Perpendicular magnetic recording (PMR), wherein the recorded bits are stored in a perpendicular or out-of-plane orientation in the recording layer, allows for high recording densities in magnetic recording data storage devices such as hard disk drives. The write head must be able to write data not only at high bit densities but also at high data rates.

The switching time for the write pole of the write head to switch from one magnetization direction to the other is a limiting factor as the data rate is increased in PMR. At high data rates, the available magnetic flux from the write head, as seen by the recording layer on the disk, is dominated by the low-frequency flux output of the write head. The reason for such loss of write flux includes a slow intrinsic time-constant of the magnetization reversal in the main pole of the write head. Also, lower data-rate systems require additional overshoot of the write current from the disk drive's write driver circuitry to aid in the magnetization reversal. This additional overshoot requires additional power from the write driver circuitry.

Perpendicular magnetic recording systems with high-frequency assisted writing using a spin-torque oscillator (STO) have been proposed. The STO, which comprises a field-generation layer (FGL) and spin-polarization layer (SPL), is placed within in the write gap. The write head generates a write field that, beneath the main pole, is substantially perpendicular to the magnetic recording layer, and the STO generates a high-frequency auxiliary field to the recording layer. Ideally, the auxiliary field has a frequency close to the resonance frequency of the magnetic grains in the recording layer to facilitate the switching of the magnetization of the grains. As a consequence, the oscillating field of the STO's FGL resonates with the media and provides strong writing despite having a narrow writer.

U.S. patent application Ser. No. 15/140,761, filed Apr. 28, 2016 and hereby incorporated by reference, discloses writers with spin-torque-assisted write field enhancement that use a DC-field-generation (DFG) layer to create an auxiliary magnetic field that adds constructively to the write field and thereby enables high-density magnetic recording. A significant benefit of writers that use a DFG layer is that they enable high-density magnetic recording without requiring resonance with the media. Consequently, there is no need to jointly optimize the writer and the media of the disk drive as there would be to achieve high performance with a writer using an STO.

Regardless of whether a magnetic write head uses an STO or a configuration with a DFG layer as disclosed in U.S. application Ser. No. 15/140,761, there is an ongoing need to improve the performance of the writer.

SUMMARY

Disclosed herein are apparatuses and method for writing to a magnetic medium, and data storage devices including such apparatuses and methods. In some embodiments, the apparatus comprises a main pole; a trailing shield; a write-field-enhancing structure disposed within a write gap between the main pole and the trailing shield; a write coil configured to magnetize the main pole; a write current control circuit configured to supply a write current to the write coil to record a bit to a magnetic medium, wherein the write current comprises a write pulse; and a driving current control circuit configured to supply a driving current to the write-field-enhancing structure, wherein the driving current comprises a driving pulse, and wherein the driving current comprises an AC component with a duty cycle selected based at least in part on a power constraint. The write-field-enhancing structure comprises a spacer disposed between the main pole and the trailing shield, wherein the spacer is non-magnetic, a non-magnetic layer disposed between the main pole and the trailing shield, and a free layer adjacent to the spacer and disposed between the spacer and the non-magnetic layer, wherein the free layer is magnetic. In some embodiments, the free layer is the only magnetic layer within the write gap that is not adjacent to the main pole or the trailing shield.

In some embodiments, the driving pulse is delayed by an amount of time relative to the write pulse. In some such embodiments, the amount of time is less than approximately 500 picoseconds. In some embodiments, a timing of the driving pulse is based on a timing of the write pulse. In some embodiments, a duration of the driving pulse is greater than zero and less than approximately 500 picoseconds. In some embodiments, the driving pulse has at least two non-zero amplitudes.

In some embodiments, the driving current control circuit is further configured to adjust at least one characteristic of the driving pulse based on the write current or based on an upcoming bit to be recorded. In some such embodiments, the at least one characteristic of the driving pulse comprises an amplitude, a delay relative to the write pulse, or a duration.

In some embodiments, the driving current further comprises an advance pulse preceding the driving pulse. In some such embodiments, an amplitude of the advance pulse is less than an amplitude of the driving pulse. In some embodiments in which the driving current further comprises an advance pulse, an amplitude of the advance pulse is less than or equal to zero. In some embodiments in which the driving current further comprises an advance pulse, the driving current control circuit is further configured to adjust at least one characteristic of the advance pulse based on the write current or based on an upcoming bit to be recorded. In some such embodiments, the at least one characteristic of the advance pulse comprises an amplitude, a delay relative to the write pulse, or a duration.

A method of writing to a magnetic medium comprises supplying a write current to a write coil of a magnetic write head, supplying a driving current to a free layer disposed in a write gap between a main pole and a trailing shield of the magnetic write head, wherein the driving current comprises an AC component, and selecting a duty cycle of the AC component based at least in part on a power constraint. In some embodiments, the method further comprises determining a timing of the AC component based on an upcoming bit to be recorded on the magnetic medium, and supplying the driving current to the free layer is based on the upcoming bit. In some embodiments, the free layer is the only magnetic layer within the write gap that is not adjacent to the main pole or the trailing shield of the magnetic write head.

In some embodiments, the method further comprises selecting a timing of the driving current relative to the write current. In some embodiments, the method further comprises selecting a duration or amplitude of the AC component based at least in part on a power constraint. In some embodiments, the AC component has a duty cycle, and the method further comprises selecting the duty cycle based at least in part on a power constraint.

In some embodiments, the AC component comprises an advance pulse and a driving pulse, wherein the advance pulse precedes the driving pulse. In some such embodiments, an amplitude of the advance pulse is less than an amplitude of the driving pulse. In some embodiments in which the AC component comprises an advance pulse, an amplitude of the advance pulse is less than or equal to zero.

In some embodiments, the method further comprises optimizing at least one characteristic of the AC component based on the write current. In some such embodiments, the at least one characteristic comprises an amplitude, a delay relative to a write pulse of the write current, a duty cycle, or a duration.

BRIEF DESCRIPTION OF THE DRAWINGS

The disclosure herein is illustrated by way of example, and not by way of limitation, in the figures of the accompanying drawings, in which like reference numerals refer to similar elements and in which:

FIG. 13A illustrates an exemplary write current and a driving current in accordance with some embodiments.

FIG. 13B illustrates the AC and DC components of a driving current in accordance with some embodiments.

FIG. 14 illustrates another driving current in accordance with some embodiments.

DETAILED DESCRIPTION

The following description is made for the purpose of illustrating the general principles of the present disclosure and is not meant to limit the inventive concepts claimed herein. Furthermore, particular embodiments described herein may be used in combination with other described embodiments in various possible combinations and permutations.

Disclosed herein are apparatuses and methods to improve the performance of the writer of a data storage device, such as a hard disk drive, that includes an STO or a DFG layer in the write gap. Rather than supply a DC bias current to the STO or to the structure containing the DFG layer, the disclosed apparatuses and methods use an AC bias current that provides a performance improvement by improving the switching speed of the SPL/FGL or the DFG layer, which can be leveraged to reduce power consumption and thereby improve write head reliability and durability. Specifically, the performance of the write head can be improved while maintaining a specified power level, or the performance of the write head can be maintained while using a lower power level.

Figure 1:
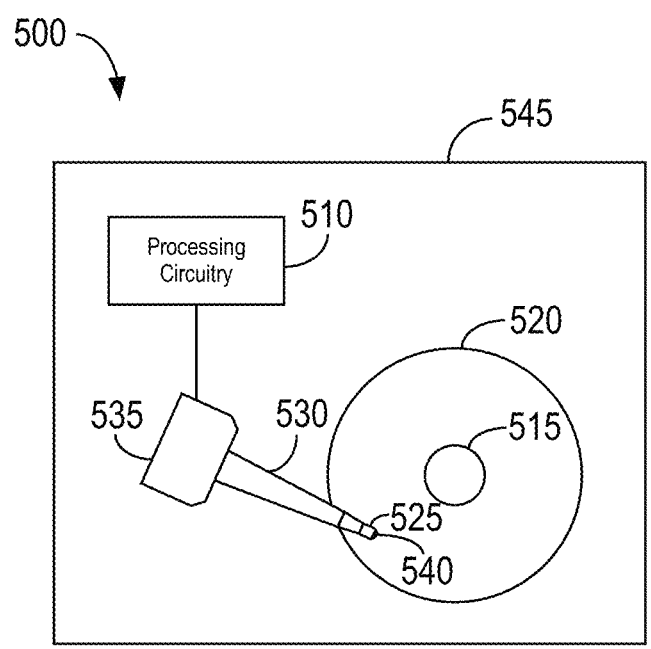
FIG. 1 illustrates several components of an exemplary hard disk drive in accordance with some embodiments.

FIG. 1 illustrates several components of an exemplary hard disk drive 500 that may embody some embodiments. The magnetic hard disk drive 500 includes a spindle 515 that supports and rotates a magnetic disk 520. The spindle 515 is rotated by a spindle motor (not shown) that is controlled by a motor controller (not shown) that may be implemented in electronics of the hard disk drive 500. A slider 525, which is supported by a suspension and actuator arm 530, includes a combined read and write magnetic head 540. An actuator 535 rotatably positions the suspension and actuator arm 530 over the magnetic disk 520. The components of the hard disk drive 500 may be mounted on a housing 545. It is to be understood that although FIG. 1 illustrates a single disk 520, a single slider 525, a single head 540, and a single suspension and actuator arm 530, hard disk drive 500 may include a plurality (i.e., more than one) of disks 520, sliders 525, heads 540, and suspension and actuator arms 530.

The slider 525 has a gas-bearing surface that faces the surface of the disk 520 and counteracts a preload bias that pushes the slider toward the disk 520. For convenience, in this document the gas-bearing surface is referred to as the air-bearing surface (ABS) and the gas is generally referred to as "air," although it is to be understood that the gas used in a hard disk drive 500 may be a gas other than air (e.g., the gas may be helium). For simplicity, throughout this disclosure, the surface of the slider 525 that faces or that will eventually face the disk 520 is referred to as the ABS.

As the disk 520 rotates, the disk 520 drags air under the slider 525 and along the ABS in a direction approximately parallel to the tangential velocity of the disk 520. As the air passes under the ABS, air compression along the air flow path causes the air pressure between the disk 520 and the ABS to increase, which creates a hydrodynamic lifting force that counteracts the tendency of the suspension and actuator arm 530 to push the slider 525 toward the disk 520. The slider 525 thus flies above the disk 520 but in close proximity to the surface of the disk 520.

In operation, the actuator 535 moves the suspension and actuator arm 530 to position the slider 525 so that the magnetic head 540 is in a transducing relationship with the surface of the magnetic disk 520. The head 540 may be used to write information to one or more tracks on the surface of the disk 520 and to read previously-recorded information from the tracks on the surface of the disk 520. Processing circuitry 510 provides to the head 540 signals representing information to be written to the disk 520 and receives from the head 540 signals representing information read from the disk 520. The processing circuitry 510 also provides signals to the spindle motor to rotate the magnetic disk 520, and to the actuator 535 to move the slider 525 to various tracks.

For writing, the head 540 may use a single pole writer that has a main pole surrounded by magnetic shield materials. The main pole is typically separated from the magnetic shield materials by a non-magnetic spacer. The main pole may have a tapered shape with a tip that faces the magnetic recording media and is part of the ABS. The single pole writer may include a conductive coil encircling the writer pole in a helical or pancake like configuration.

To write to the disk 520, the slider 525 passes over a region of the disk 520, and an electric current is applied through the coil of the head 540, which causes a large magnetic field to be generated from the main pole tip. The polarity of the generated field causes a region of the magnetic disk 520 to assume a polarity, thus enabling information to be stored on the disk 520.

To read information from the disk 520, the head 540 may include only one read sensor, or it may include multiple read sensors. The read sensor(s) in the head 540 may include, for example, one or more giant magnetoresistance (GMR) sensors, tunneling magnetoresistance (TMR) sensors, or another type of magnetoresistive sensor. When the slider 525 passes over a region of the disk 520, the head 540 detects changes in resistance due to magnetic field variations recorded on the disk 520, which represent the recorded bits.

Figure 2:
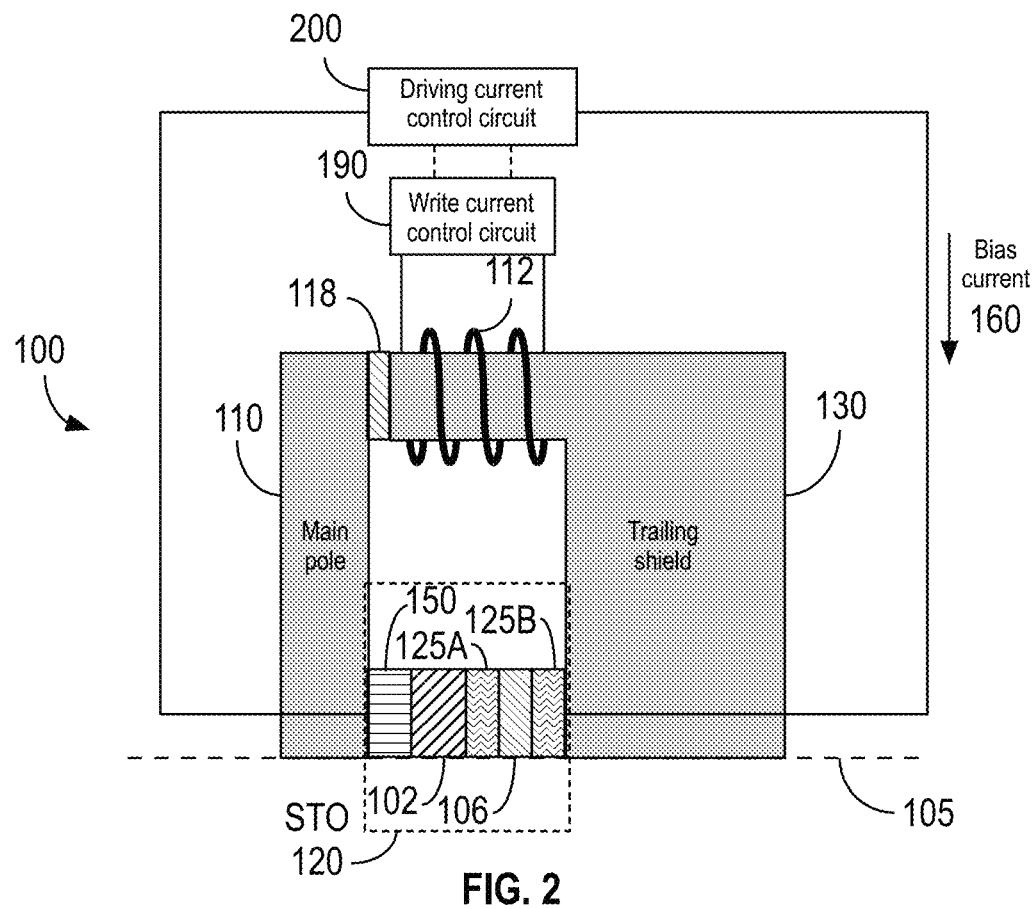
FIG. 2 is a simplified illustration of an apparatus for writing to a magnetic media in accordance with some embodiments.

FIG. 2 is a simplified illustration of an apparatus 100 for writing to a magnetic media. The apparatus 100 includes a STO 120 disposed in the write gap between a main pole 110 and a trailing shield 130 of a write head. The apparatus 100 also includes a write coil 112 wound around a magnetic circuit that includes the main pole 110 and the trailing shield 130. The apparatus 100 also includes a driving current control circuit 200 and a write current control circuit 190. As shown by the dashed lines in FIG. 2, the driving current control circuit 200 and the write current control circuit 190 may be coupled in such a way as to enable the write current control circuit 190 to provide trigger signals to the driving current control circuit 200, as discussed below.

The main pole 110 is typically made from a high-saturation magnetization material for generating a write field that is substantially perpendicular to the surface of the magnetic disk over which the slider 525 flies. Away from the ABS 105, the main pole 110 and trailing shield 130 are coupled by a nonconductive material 118 (e.g., $SiO_2$) that electrically insulates the main pole 110 from the trailing shield 130.

The write coil 112 is connected to the write current control circuit 190, which may be implemented in a system on a chip (SoC) as part of the processing circuitry 510. In order to write to the magnetic media, the write current control circuit 190 supplies a write current to the write coil 112. The write coil 112 magnetizes the main pole 110 and causes the main pole 110 to generate a write field that is substantially perpendicular to the ABS 105, which then interacts with the magnetic media on the disk 520 to record information onto the magnetic media.

The STO 120 includes a non-magnetic layer 150, SPL 102, a first spacer 125A, a FGL 106, and a second spacer 125B. The STO 120 is coupled to the driving current control circuit 200 through the main pole 110 and the trailing shield 130. The driving current control circuit 200 may be implemented in a SoC as part of the processing circuitry 510.

When the driving current control circuit 200 applies a sufficient bias current 160 to the STO 120, the magnetizations of both the SPL 102 and the FGL 106 oscillate, with the frequency of the FGL 106 magnetization typically being much smaller than the frequency of the SPL 102 magnetization. The FGL 106 magnetization precesses, which generates an elliptically polarized AC field that, ideally, resonates with the magnetic media. In addition, the down-track component of the FGL 106 magnetization is approximately constant, which causes a negative DC field component that is weaker than when no bias current 160 is applied. The SPL 102 magnetization also precesses, but the frequency of the resulting AC field is too high to induce media resonance. The frequency of the SPL 102 magnetization is typically so much larger than the effective resonant frequency of the media that the media cannot respond to it. Consequently, the contribution of the SPL 102 magnetization is primarily DC. As the magnetizations of the SPL 102 and the FGL 106 oscillate, the FGL 106 magnetization has a DC component that is aligned with the writer's gap field. The FGL 106 magnetization causes a negative FGL DC field component that reduces the write field in the media. The DC component of the SPL 102 magnetization, on the other hand, is aligned opposite to the gap field, causing a SPL DC field component that is a "positive DC effect," which enhances the write field in the media.

Figure 3:
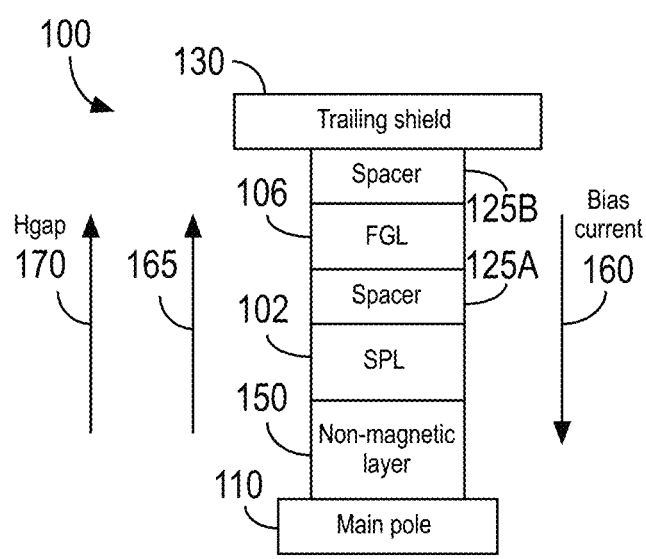
FIG. 3 is an ABS view of the apparatus shown in FIG. 2.

FIG. 3 is an ABS view of the apparatus 100 shown in FIG. 2. The bias current 160 generated by the driving current control circuit 200 flows in the direction from the trailing shield 130 to the main pole 110; by the definition of current, the electron flow 165 is in the opposite direction. Note that the direction of Hgap 170 will reverse if the write coil's excitation changes polarity (e.g., if the apparatus 100 is writing an "up" bit instead of a "down" bit, or vice versa), with the magnetic orientation of the FGL 106 being opposite as well, such that the DC component of the FGL 106 magnetization still opposes Hgap 170.

Co-pending U.S. application Ser. No. 15/140,761 discloses spin-torque-assisted write field enhancement using a DC-field-generating (DFG) layer in the write gap. The DFG layer produces a DC magnetization component that adds constructively to the write field and thereby typically provides superior performance relative to a conventional STO. In particular, the DFG layer generates a larger field gradient and a larger write field magnitude, which results in smaller transition jitter and a larger low-frequency signal-to-noise ratio.

Figure 4:
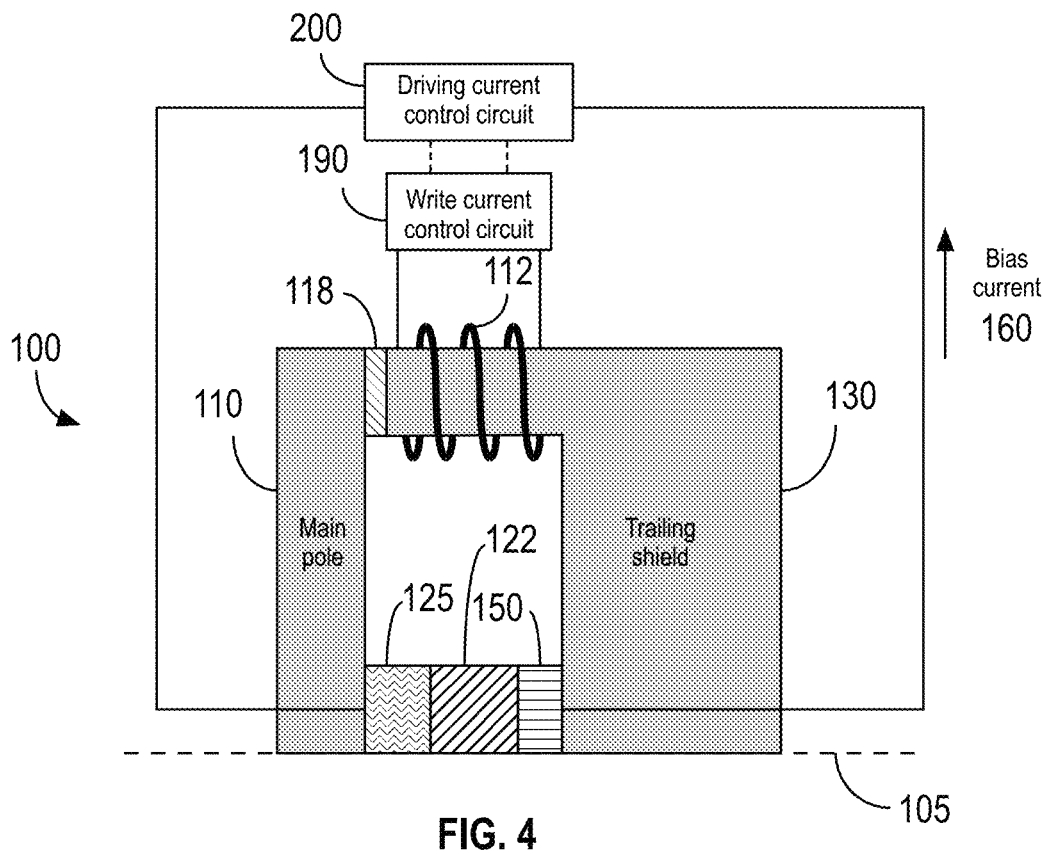
FIG. 4 is a simplified illustration of a portion of an apparatus in accordance with some embodiments that use a DFG layer in a "main-pole-integrated" or "MP-integrated" configuration.

FIG. 4 is a simplified illustration of a portion of an apparatus 100 in accordance with some embodiments that use a DFG layer 122 in a "main-pole-integrated" or "MP-integrated" configuration. As shown in FIG. 4, a DFG layer 122, which is magnetic, is included in the write gap between the main pole 110 and the trailing shield 130. In the exemplary embodiment of FIG. 4, a spacer 125, which is non-magnetic, is adjacent to the main pole 110, which is the spin source for the DFG layer 122, and the DFG layer 122 is adjacent to the spacer 125. In some embodiments, an optional magnetic notch (not shown) may be interposed between the main pole 110 and the spacer 125. A non-magnetic layer 150 is adjacent to the DFG layer 122 and the trailing shield 130.

Figure 5:
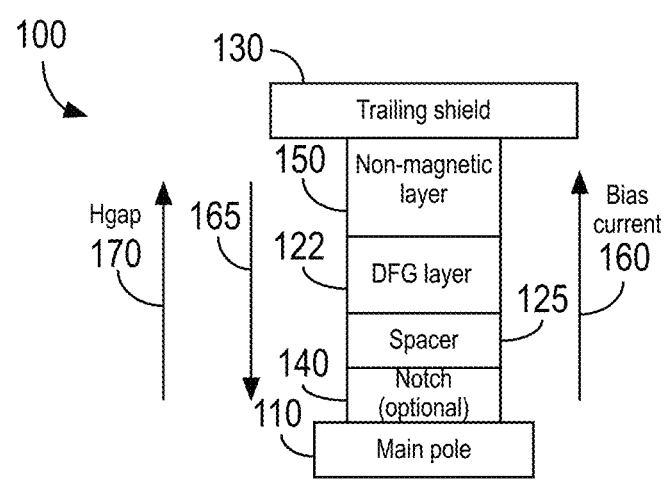
FIG. 5 is view of the air-bearing surface (ABS) of the apparatus shown in FIG. 4 with an optional magnetic notch added between the spacer and the main pole.

FIG. 5 is view of the ABS 105 of the apparatus 100 shown in FIG. 4 with an optional magnetic notch 140 added between the spacer 125 and the main pole 110. The purpose of the magnetic notch 140 is twofold. First, the magnetic notch 140 provides the spin-torque necessary to align the DC component of the DFG layer 122 magnetization opposite to Hgap 170 without undesired loss of spin current arising from potential interfacial imperfections and discontinuities due to depositing the spacer 125 directly on the main pole 110. Second, the magnetic notch 140 improves crystalline growth of the spacer 125 and the DFG layer 122 by acting as a seed layer deposited on the surface of the main pole 110, while keeping a suitable separation between the main pole 110 and trailing shield 130. As illustrated in FIG. 5, the bias current 160 flows in the direction from the main pole 110 to the trailing shield 130; by the definition of current, the electron flow 165 is in the opposite direction. Note that the direction of Hgap 170 will reverse if the write coil's excitation changes polarity (e.g., if the apparatus 100 is writing an "up" bit instead of a "down" bit, or vice versa), with the magnetic orientation of the DFG layer 122 being opposite as well, such that the DC component of the DFG layer 122 magnetization still opposes Hgap 170.

If present, the magnetic notch 140 may be made of the same material as the main pole 110. For example, both the main pole 110 and the magnetic notch 140 may comprise iron-cobalt.

Figure 6:
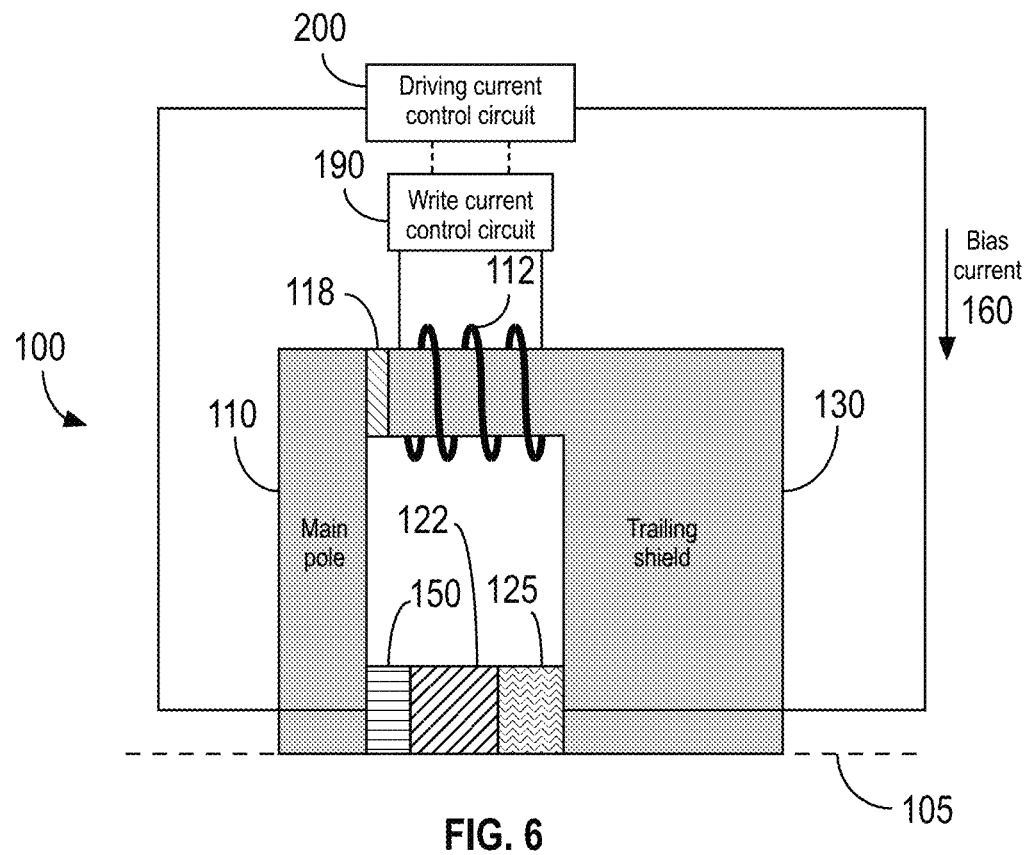
FIG. 6 is a simplified illustration of an apparatus in accordance with other embodiments that use a DFG layer in a "trailing-shield-integrated" or "TS-integrated" configuration.

FIG. 6 is a simplified illustration of an apparatus 100 in accordance with other embodiments that use a DFG layer 122 in a "trailing-shield-integrated" or "TS-integrated" configuration. As shown in FIG. 6, the non-magnetic layer 150 is disposed between the main pole 110 and the DFG layer 122. The spacer 125 is adjacent to the DFG layer 122 and disposed between the DFG layer 122 and the trailing shield 130. As in the exemplary MP-integrated embodiment shown in FIGS. 4 and 5, an optional notch (not shown in FIG. 6) may be included between the spacer 125 and the trailing shield 130 in TS-integrated configurations. In the embodiment of FIG. 6, the trailing shield 130 is the spin source for the DFG layer 122.

Figure 7:
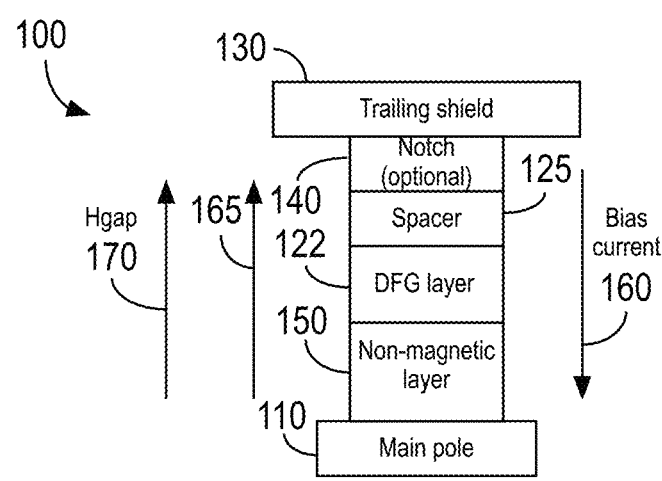
FIG. 7 is a view of the ABS of the apparatus shown in FIG. 6 with an optional magnetic notch added between the spacer and the trailing shield.

FIG. 7 is a view of the ABS 105 of the apparatus 100 shown in FIG. 6 with an optional magnetic notch 140 added between the spacer 125 and the trailing shield 130. The purpose of the magnetic notch 140 is as stated previously, namely to provide the spin-torque necessary to align the DFG layer 122 DC magnetization component opposite to Hgap 170 without undesired loss of spin current, and to improve crystalline growth of the spacer 125 and the DFG layer 122. As illustrated in FIG. 7, the bias current 160 flows in the direction from the trailing shield 130 to the main pole 110; thus, as explained previously, the electron flow 165 is in the opposite direction. As explained above, the direction of Hgap 170 will be opposite if the write coil's excitation changes polarity, with the magnetic orientation of the DFG layer 122 being opposite as well, such that the DC magnetization component still opposes Hgap 170.

If present, the magnetic notch 140 may be made of the same material as the trailing shield 130. For example, both the trailing shield 130 and the magnetic notch 140 may comprise iron-cobalt.

The disclosures herein apply both to classic STO structures, such as shown in FIGS. 2 and 3, and to structures using a DFG layer, such as shown in FIGS. 4-7. For convenience, all of these structures are referred to herein as "write-field-enhancing structures." The FGL 106 and SPL 102 of the STO 120 and the DFG layer 122 are all referred to herein as "free layers." Thus, the phrase "free layer of a write-field-enhancing structure" may refer to the FGL 106 and/or SPL 102 of an STO 120 (FIGS. 2 and 3), or the DFG layer 122 of a TS-integrated or MP-integrated embodiment (FIGS. 4-7).

Typically, the bias current provided to a write-field-enhancing structure when the write head is writing to a magnetic media has only a DC component. In other words, the bias current 160 supplied to the write-field-enhancing structure is constant. It is desirable to improve the switching speed of the free layer of a write-field-enhancing structure. Doing so improves the performance of the write head by providing a stronger auxiliary field that adds constructively to the write field while bits are written.

Figure 8:
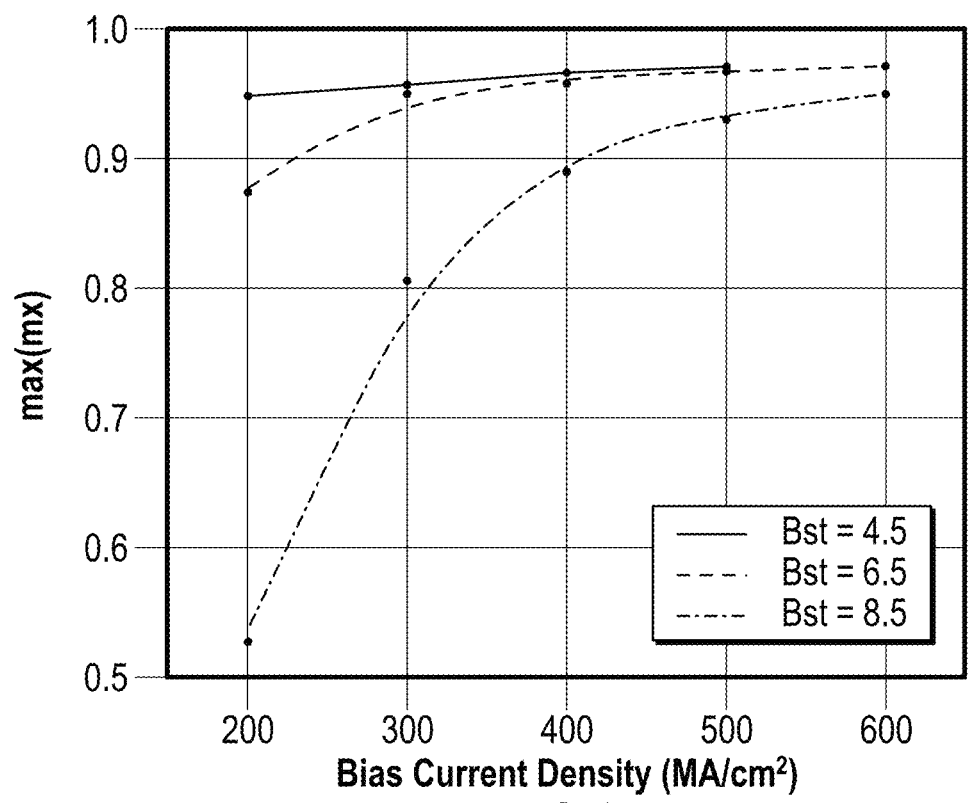
FIG. 8 illustrates the maximum value for the average time/volume component of the magnetization of the free layer against the gap field direction as a function of the bias current for three values of Bst.
Figure 9:
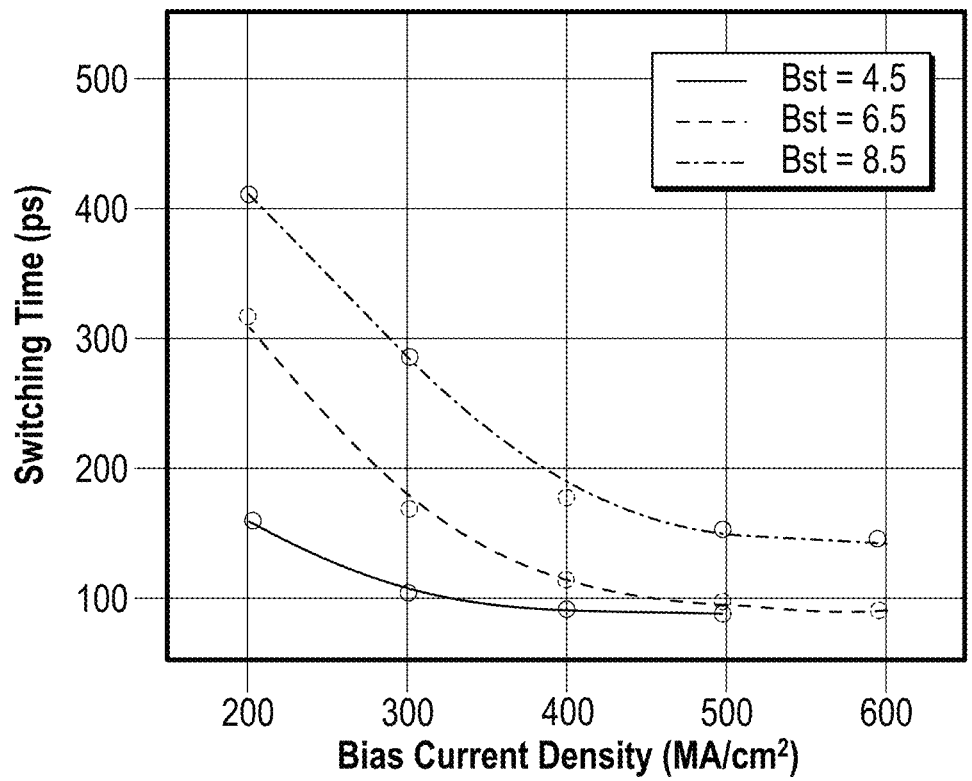
FIG. 9 illustrates the switching time, in picoseconds, as a function of bias current for three free layers having different Bst values.

One way to improve the switching speed of the free layer is to increase the current density of the bias current 160. FIGS. 8 and 9 illustrate the effect of increasing the bias current 160 on the switching characteristics of the free layer of a write-field-enhancing structure. FIG. 8 illustrates the maximum value for the average time/volume component of the magnetization of the free layer against the gap field direction (i.e., the normalized magnetization perpendicular to the free-layer plane, Mx/Ms), denoted as "max(mx)," as a function of the bias current (in $MA/cm^2$) for three free-layer saturation magnetization densities, Bst. A value of one for max(mx) means that the free layer is completely antiparallel to the gap field direction. In FIG. 9, the curves illustrate the switching time, in picoseconds, as a function of bias current for three free layers having different Bst values. Free layers with larger Bst values can provide stronger auxiliary write fields, but, as FIGS. 8 and 9 show, given a particular bias current, free layers with higher Bst values are slower to switch and do not switch as well as free layers with lower Bst values.

Referring to FIG. 8, the solid curve illustrates that for a free layer having a saturation magnetization density (Bst)

value of 4.5 Tnm, the value of max(mx) improves only slightly when the bias current is increased. For a free layer having a Bst value of 6.5 Tnm, increasing the bias current from 200 to 300 MA/cm$^2$ improves the value of max(mx) from under 0.9 to nearly 0.95, and increasing the bias current to 500 MA/cm$^2$ causes the free layer having a Bst value of 6.5 Tnm to perform approximately as well as a free layer having a Bst value of 4.5 Tnm. The dash-dot curve shows the effect of increasing the bias current on a free layer having a Bst value of 8.5 Tnm. When the bias current is 200 MA/cm$^2$, the value of max(mx) is close to 0.5, which indicates poor performance. The bias current must be increased to 300-400 MA/cm$^2$ before the value of max(mx) improves substantially. The bias current must be increased to around 500 MA/cm$^2$ before the performance of the free layer with the largest Bst value approaches the performance of the free layers with lower Bst values.

FIG. 9 illustrates the effect of increasing the bias current on the switching time of free layers having different thicknesses. The solid curve illustrates that the switching time of a free layer having a Bst value of 4.5 Tnm can be improved marginally by increasing the bias current, with most of the improvement achieved by using a bias current of 300 MA/cm$^2$. In other words, bias currents of 400 MA/cm$^2$ and higher provide little additional benefit in switching time. The potential improvements with higher bias currents are substantially greater for free layers with higher Bst values. The switching time of a free layer with a Bst value of 6.5 Tnm requires over 300 ps to switch when the bias current is 200 MA/cm$^2$ but less than 200 ps when the bias current is 300 MA/cm$^2$. The switching time of a free layer with a Bst value of 6.5 Tnm is on the order of the switching time of a free layer with a Bst value of 4.5 Tnm when the bias current is approximately 500 MA/cm$^2$. For a free layer with a Bst value of 8.5 Tnm, the switching time is over 400 ps when the bias current is 200 MA/cm$^2$. The bias current must be increased to 400 MA/cm$^2$ to cause the free layer to switch in less than 200 ps.

Thus, FIGS. 8 and 9 illustrate that the performance of the free layer of a write-field-enhancing structure can be improved by increasing the bias current. The drawback of this approach, however, is that higher bias current densities increase power consumption and tend to decrease reliability of the write head. Therefore, alternative approaches are needed.

Figure 10:
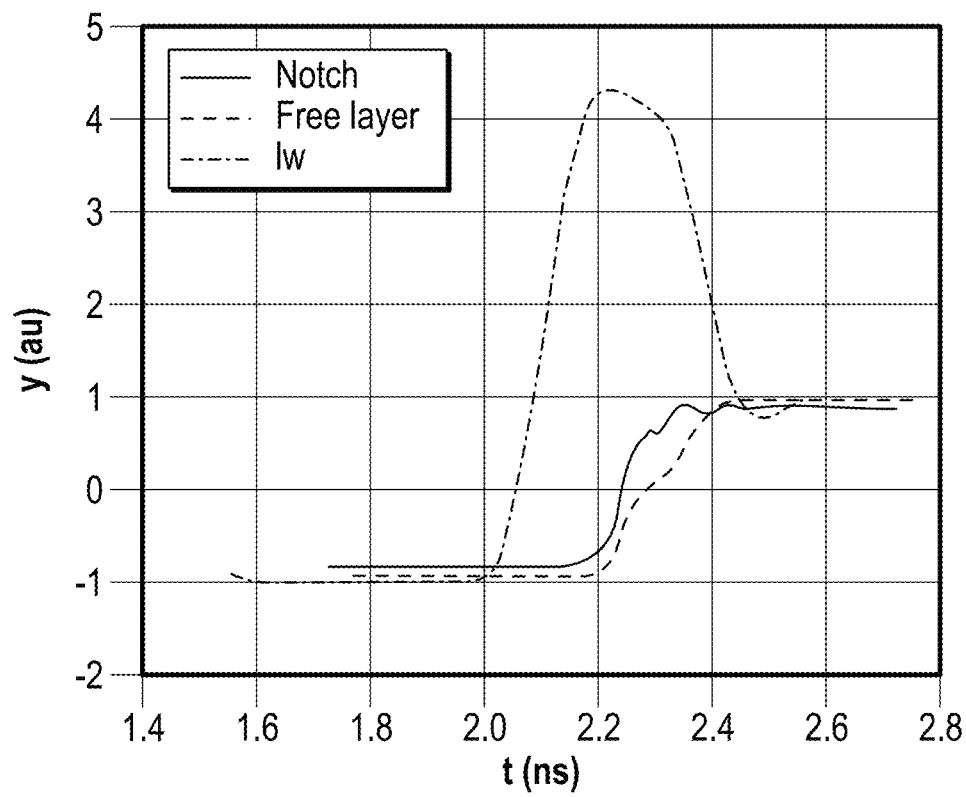
FIG. 10 illustrates the write current, shown normalized to its base value, as a function of time for a write head in which the bias current density is 200 MA/cm$^2$ and the free layer has a Bst value of 4.5 Tnm.

FIG. 10 plots the write current, shown normalized to its base value, as a function of time for a write head in which the bias current density is 200 MA/cm$^2$ and the free layer has a Bst value of 4.5 Tnm. The write current, illustrated by the dash-dot curve, begins to rise at approximately 2 ns. The solid and dashed curves show, respectively, the normalized magnetization perpendicular to the free-layer plane (i.e., normalized Mx/Ms) for the (optional) notch and free layer. The solid curve illustrates that the notch does not react to the write current until approximately 200 ps after the write current begins rising. The dashed curve illustrates that the free layer itself does not react until approximately 50 ps after the notch reacts. These observations suggest that the bias current does not have an effect on the notch and free layer until at least 200 ps after the write current switches to record a bit.

Figure 11:
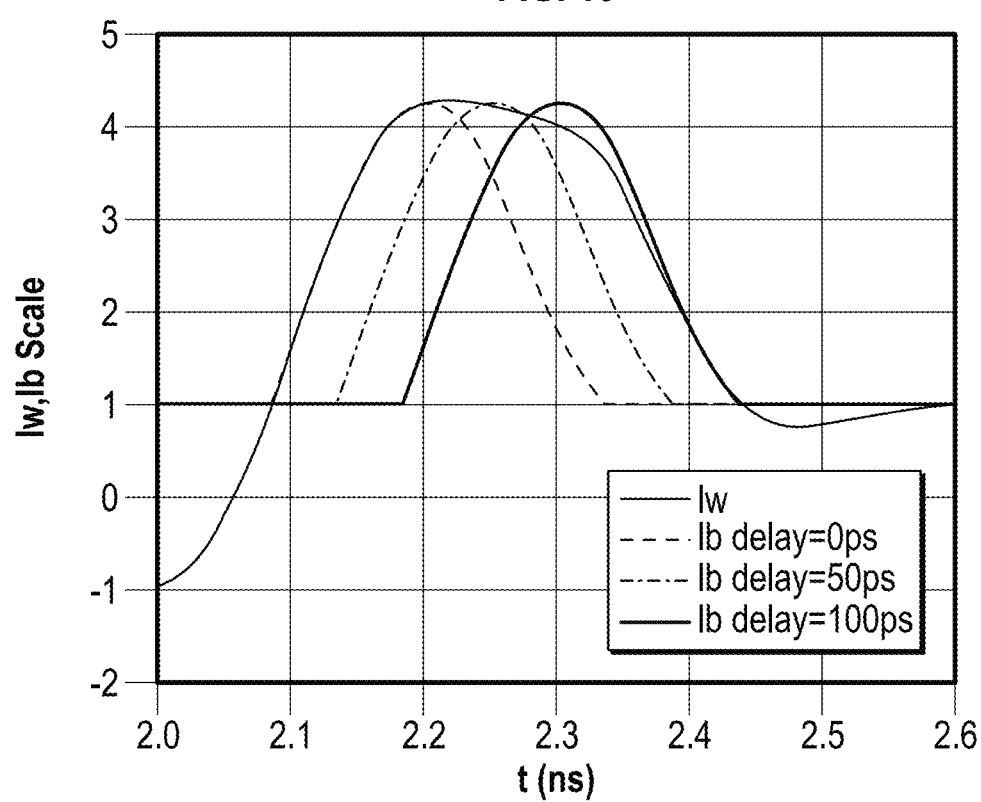
FIG. 11 illustrates possible time offsets of the bias current normalized relative to the write pulse in accordance with some embodiments.

With the understanding that higher bias currents improve the switching performance of the free layer of write-field-enhancing structures, and having observed that the bias current has little effect on the free layer until some time after the start of the write current pulse, the inventors conceived of the idea of supplying a pulsed or AC bias current to the write-field-enhancing structure with a time offset from the write current pulse to obtain the benefits of higher bias currents without decreasing the reliability of the write head. FIG. 11 illustrates several possible time offsets of the bias current normalized relative to the write pulse (thin solid curve). The dashed curve shows the bias current with no delay relative to the write pulse, and the dash-dot and thick solid curves, respectively, show the bias current with a 50 ps delay and with a 100 ps delay.

Figure 12:
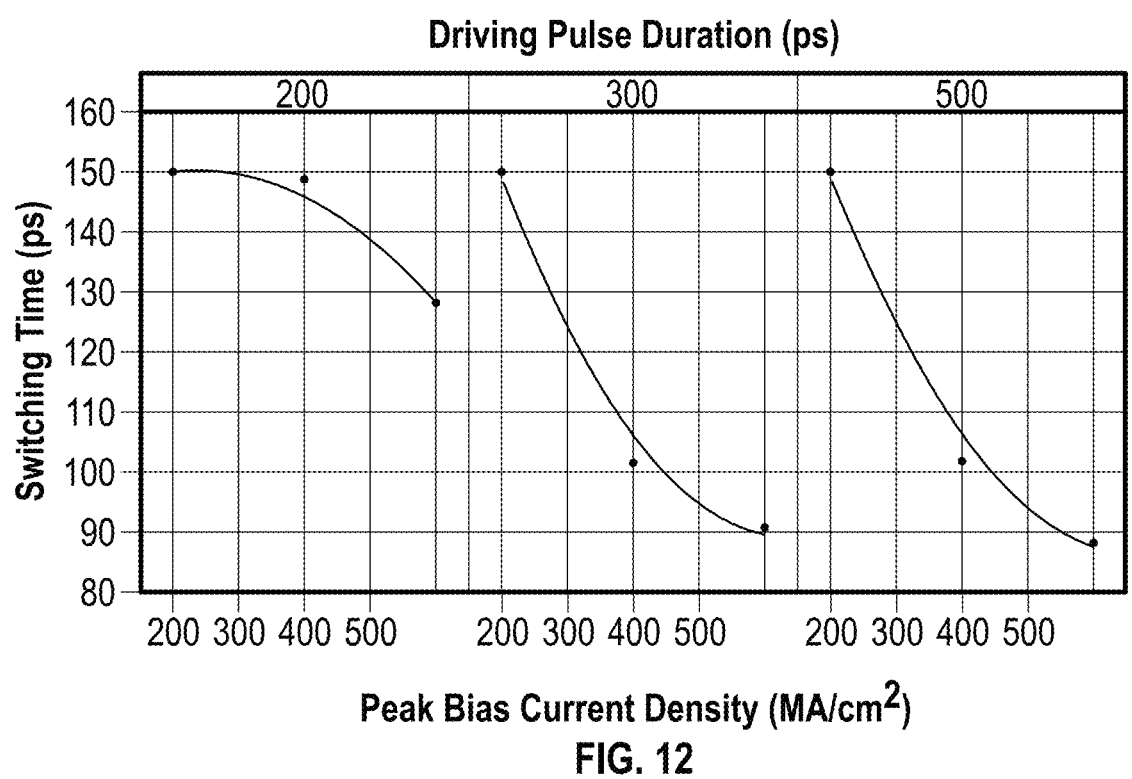
FIG. 12 illustrates the effect of the duration of the driving pulse on the switching time of the free layer in accordance with some embodiments.

FIG. 12 illustrates the effect of the duration of the bias current pulse, referred to as the driving pulse, on the switching time of the free layer when the driving pulse has zero delay relative to the write pulse. When the driving pulse duration is 200 ps, the switching time does not improve significantly even when the peak bias current density exceeds 500 MA/cm$^2$. This result suggests that the driving pulse should have a duration of at least 200 ps, when the driving pulse is not delayed relative to the write pulse. When the driving pulse has a duration of 300 ps, the switching time falls off sharply with increasing peak base current. When the driving pulse has a duration of 500 ps, the switching time falls off approximately as sharply as when the driving pulse duration is 300 ps. Thus, FIG. 12 suggests that the driving pulse duration should be greater than 200 ps but less than 500 ps. In other words, driving pulses shorter than about 200 ps do not cause the desired decrease in free-layer switching time regardless of their amplitudes, and driving pulses that are 500 ps long do not provide any benefit relative to driving pulses that are 300 ps long. The duration of the driving pulse can be reduced if the driving pulse is delayed (or offset in time) relative to the write pulse. Therefore, FIG. 12 indicates that the driving pulse duration and amplitude, along with the time offset discussed previously, may be optimized jointly to provide the desired performance.

FIG. 13A illustrates an exemplary write current. The write current comprises a write pulse 195. The write current is shown with levels relative to the value shown as "1" in the plot. For example, the level of the write current at a y-axis value of 3 is three times the level corresponding to the y-axis value of 1. As a concrete example, if the level of the write current at t=2.5 ns is 40 mA, the level of the write current at t=2.2 ns is 120 mA. In the example shown in FIG. 13A, the write pulse 195 has a first rising edge beginning at 2.0 ns. Once the write pulse 195 reaches the level denoted as "3," the write pulse 195 remains constant until the time of its first falling edge (approximately 2.3 ns), which reduces the write pulse 195 to the level denoted as "1" between 2.4 ns and 3.0 ns. At 3 ns, the second falling edge begins, which reduces the write pulse 195 to the level denoted as "−3" before the second rising edge returns the write pulse 195 to its starting value at the level denoted as "−1."

Shown below the exemplary write current in FIG. 13A is a driving current 160A in accordance with some embodiments. The driving current 160A has a positive DC current density 205. Preferably, the DC current density 205 is at least 50 MA/cm$^2$. The driving current 160A also comprises at least one driving pulse 250. The rising edge of the driving pulse 250 of FIG. 13A is delayed by an amount of time 210 relative to the beginning of the write pulse 195. Thus, in the embodiment illustrated in FIG. 13A, the timing of the driving pulse 250 is based on the timing of the write pulse 195. Preferably, the amount of time 210 by which the driving pulse 250 is delayed relative to the beginning of the write pulse 195 is less than or equal to 500 ps. The driving pulse 250 has an amplitude 215 relative to the DC current density 205. Preferably, the amplitude 215 of the driving pulse 250 is at least 10 percent greater than the DC current density 205.

In other words, relative to zero, the driving pulse 250 preferably has a peak amplitude that is at least 1.1 times the DC current density 205. As a specific example, if the DC current density is 50 MA/cm², the amplitude 215 of the driving pulse 250 is preferably at least 5 MA/cm², so that, relative to zero, the peak amplitude of the driving pulse 250 is at least 55 MA/cm². The driving pulse 250 also has a duration 220. The duration 220 is greater than zero but, preferably, less than or equal to 500 ps.

As will be appreciated by skilled artisans, the driving current 160A is an alternating current (AC). The driving current 160A (as well as the other driving currents 160 described and illustrated herein) can be represented as the superposition of a DC component and an AC component. As illustrated in FIG. 13B, the driving current 160A has a DC component 255 at the level of the DC current density 205, and an AC component 260 that creates the driving pulses 250 in the driving current 160A. The AC component 260 is characterized by a duty cycle that may be expressed as the driving pulse 250 duration 220 divided by the period 265 of the AC component 260, which is the amount of time between the starts of consecutive driving pulses 250.

FIG. 14 illustrates the exemplary write current of FIG. 13A in conjunction with another driving current 160B in accordance with some embodiments. The driving current 160B has both driving pulses 250 and advance pulses 235. (To avoid obscuring the drawing, FIG. 14 labels only one of the two illustrated driving pulses 250 and only one of the two illustrated advance pulses 235.) As shown in FIG. 14, the driving current 160B has a positive DC current density 205. Preferably, the DC current density 205 is at least 50 MA/cm². The driving current 160B in FIG. 14 comprises at least one driving pulse 250. The driving pulse 250 is delayed by an amount of time 210 relative to the beginning of the write pulse 195. Thus, in the embodiment illustrated in FIG. 14, the timing of the driving pulse 250 is based on the timing of the write pulse 195. Preferably, the amount of time 210 by which the driving pulse 250 is delayed relative to the beginning of the write pulse 195 is less than or equal to 500 ps. The driving pulse 250 has an amplitude 215 relative to the DC current density 205. Preferably, relative to the DC current density 205, the amplitude 215 of the driving pulse 250 is at least 10 percent greater than the DC current density 205. In other words, relative to zero, the driving pulse 250 preferably has a peak amplitude that is at least 1.1 times the DC current density 205. As a specific example, if the DC current density is 50 MA/cm², the amplitude 215 of the driving pulse 250 is preferably at least 5 MA/cm², so that, relative to zero, the peak amplitude of the driving pulse is at least 55 MA/cm². The driving pulse 250 also has a duration 220. The duration 220 is greater than zero but, preferably, less than or equal to 500 ps.

Unlike the driving current 160A shown in FIG. 13A, the driving current 160B of FIG. 14 also includes an advance pulse 235 in addition to the driving pulse 250. The advance pulse 235 precedes the write pulse 195 by an amount of time 240. Thus, in the embodiment illustrated in FIG. 14, the timing of the advance pulse 235 is based on the timing of the write pulse 195. Preferably, the amount of time 240 is less than or equal to 500 ps. The advance pulse 235 has an amplitude 230. Relative to DC, the amplitude 230 of the advance pulse 235 in FIG. 14 is a negative value. The advance pulse 235 also has a duration 225. Preferably, the duration 225 is greater than zero but less than or equal to 300 ps.

As will be appreciated by skilled artisans, the driving current 160B can be represented as the superposition of a DC component and an AC component. The AC component is characterized by a duty cycle that may be expressed as the sum of the driving pulse 250 duration 220 and the advance pulse 235 duration 225 divided by the period of the AC component, which is the amount of time between the starts of consecutive driving pulses 250 (or, equivalently, the amount of time between the starts of consecutive advance pulses 235).

Figure 15:
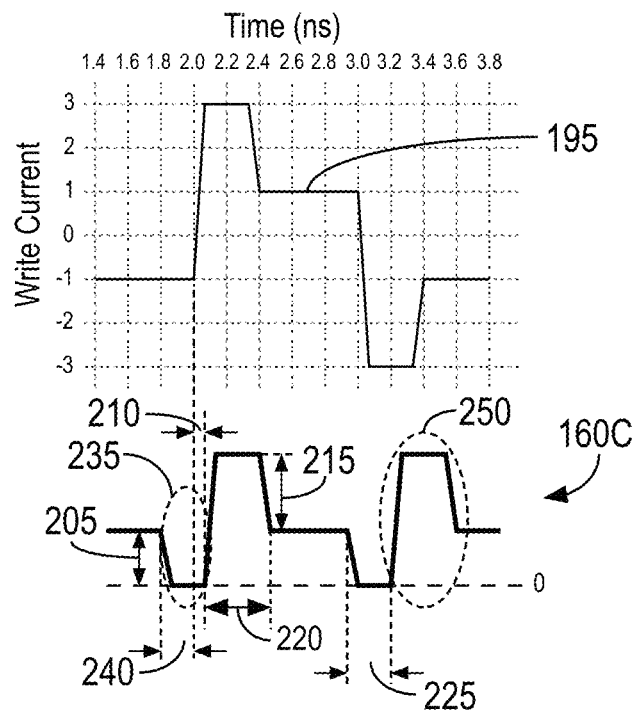
FIG. 15 illustrates another driving current in accordance with some embodiments.

FIG. 15 illustrates the exemplary write current of FIGS. 13A and 14 in conjunction with another driving current 160C in accordance with some embodiments. The driving current 160C has both driving pulses 250 and advance pulses 235. (To avoid obscuring the drawing, FIG. 15 labels only one of the two illustrated driving pulses 250 and only one of the two illustrated advance pulses 235.) As shown in FIG. 15, the driving current 160C has a positive DC current density 205. Preferably, the DC current density 205 is at least 50 MA/cm². The driving current 160C comprises at least one driving pulse 250. The driving pulse 250 is delayed by an amount of time 210 relative to the beginning of the write pulse 195. Thus, in the embodiment illustrated in FIG. 15, the timing of the driving pulse 250 is based on the timing of the write pulse 195. Preferably, the amount of time 210 by which the driving pulse 250 is delayed relative to the beginning of the write pulse 195 is less than or equal to 500 ps. The driving pulse 250 has an amplitude 215 relative to the DC current density 205. Preferably, relative to the DC current density 205, the amplitude 215 of the driving pulse 250 is at least 10 percent of the DC current density 205. In other words, relative to zero, the driving pulse 250 preferably has a peak amplitude that is at least 1.1 times the DC current density 205. As a specific example, if the DC current density is 50 MA/cm², the amplitude 215 of the driving pulse 250 is preferably at least 5 MA/cm², so that, relative to zero, the peak amplitude of the driving pulse is at least 55 MA/cm². The driving pulse 250 also has a duration 220. Preferably, the duration 220 is greater than zero but less than or equal to 500 ps.

The driving current 160C of FIG. 15 also includes an advance pulse 235 in addition to the driving pulse 250. The advance pulse 235, which has an amplitude of 0, precedes the write pulse 195 by an amount of time 240. Thus, in the embodiment illustrated in FIG. 15, the timing of the advance pulse 235 is based on the timing of the write pulse 195. Preferably, the amount of time 240 is less than or equal to 500 ps. The advance pulse 235 has a duration 225. The duration 225 is greater than zero but, preferably, less than or equal to 300 ps.

As will be appreciated by skilled artisans, the driving current 160C can be represented as the superposition of a DC component and an AC component. The AC component is characterized by a duty cycle that may be expressed as the sum of the driving pulse 250 duration 220 and the advance pulse 235 duration 225 divided by the period of the AC component, which is the amount of time between the starts of consecutive driving pulses 250 (or, equivalently, the amount of time between the starts of consecutive advance pulses 235).

Figure 16:
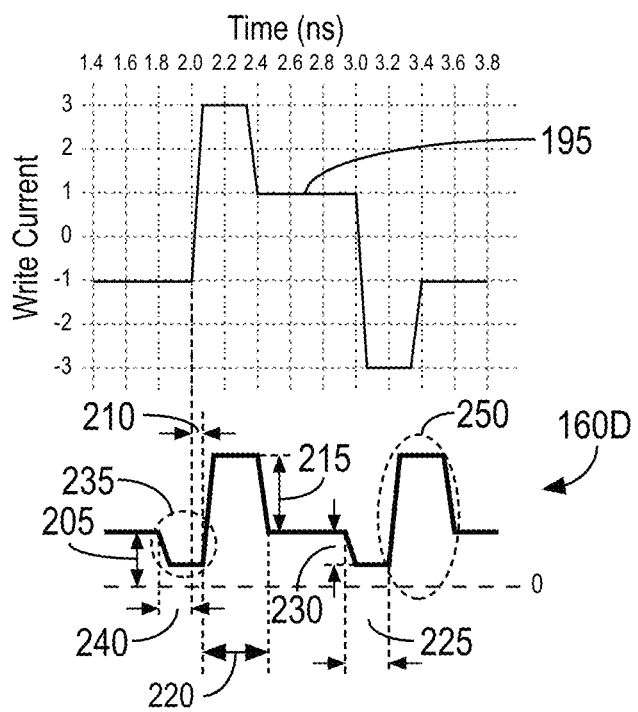
FIG. 16 illustrates another driving current in accordance with some embodiments.

FIG. 16 illustrates the exemplary write current of FIGS. 13A, 14, and 15 in conjunction with another driving current 160D in accordance with some embodiments. The driving current 160C has both driving pulses 250 and advance pulses 235. (To avoid obscuring the drawing, FIG. 16 labels only one of the two illustrated driving pulses 250 and only one of the two illustrated advance pulses 235.) As shown in FIG. 16, the driving current 160D has a positive DC current density 205. Preferably, the DC current density 205 is at least 50 MA/cm². The driving current 160D in FIG. 16 comprises at least one driving pulse 250. The driving pulse 250 is delayed by an amount of time 210 relative to the beginning of the write pulse 195. Thus, in the embodiment illustrated in FIG. 16, the timing of the driving pulse 250 is based on the timing of the write pulse 195. Preferably, the amount of time 210 by which the driving pulse 250 is delayed relative to the beginning of the write pulse 195 is less than or equal to 500 ps. The driving pulse 250 has an amplitude 215 relative to the DC current density 205. Preferably, relative to the DC current density 205, the amplitude 215 of the driving pulse 250 is at least 10 percent of the DC current density 205. In other words, relative to zero, the driving pulse 250 preferably has a peak amplitude that is at least 1.1 times the DC current density 205. As a specific example, if the DC current density is 50 MA/cm², the amplitude 215 of the driving pulse 250 is preferably at least 5 MA/cm², so that, relative to zero, the peak amplitude of the driving pulse is at least 55 MA/cm². The driving pulse 250 also has a duration 220. Preferably, the duration 220 is greater than zero but less than or equal to 500 ps.

The driving current 160D of FIG. 16 also includes an advance pulse 235 in addition to the driving pulse 250. The advance pulse 235 precedes the write pulse 195 by an amount of time 240. Thus, in the embodiment illustrated in FIG. 16, the timing of the advance pulse 235 is based on the timing of the write pulse 195. Preferably, the amount of time 240 is less than or equal to 500 ps. The advance pulse 235 has an amplitude 230. Preferably, relative to DC, the amplitude 230 of the advance pulse 235 is less than about 90 percent of the DC current density 205. In other words, relative to zero, the advance pulse 235 preferably has an amplitude that is less than 0.9 times the DC current density 205. As a specific example, if the DC current density is 50 MA/cm², the amplitude 230 of the driving pulse 250 is preferably greater than 5 MA/cm², so that, relative to zero, the amplitude of the advance pulse is less than 45 MA/cm². The advance pulse 235 also has a duration 225. Preferably, the duration 225 is greater than zero but less than or equal to 500 ps.

As will be appreciated by skilled artisans, the driving current 160D can be represented as the superposition of a DC component and an AC component. The AC component is characterized by a duty cycle that may be expressed as the sum of the driving pulse 250 duration 220 and the advance pulse 235 duration 225 divided by the period of the AC component, which is the amount of time between the starts of consecutive driving pulses 250 (or, equivalently, the amount of time between the starts of consecutive advance pulses 235).

Figure 17:
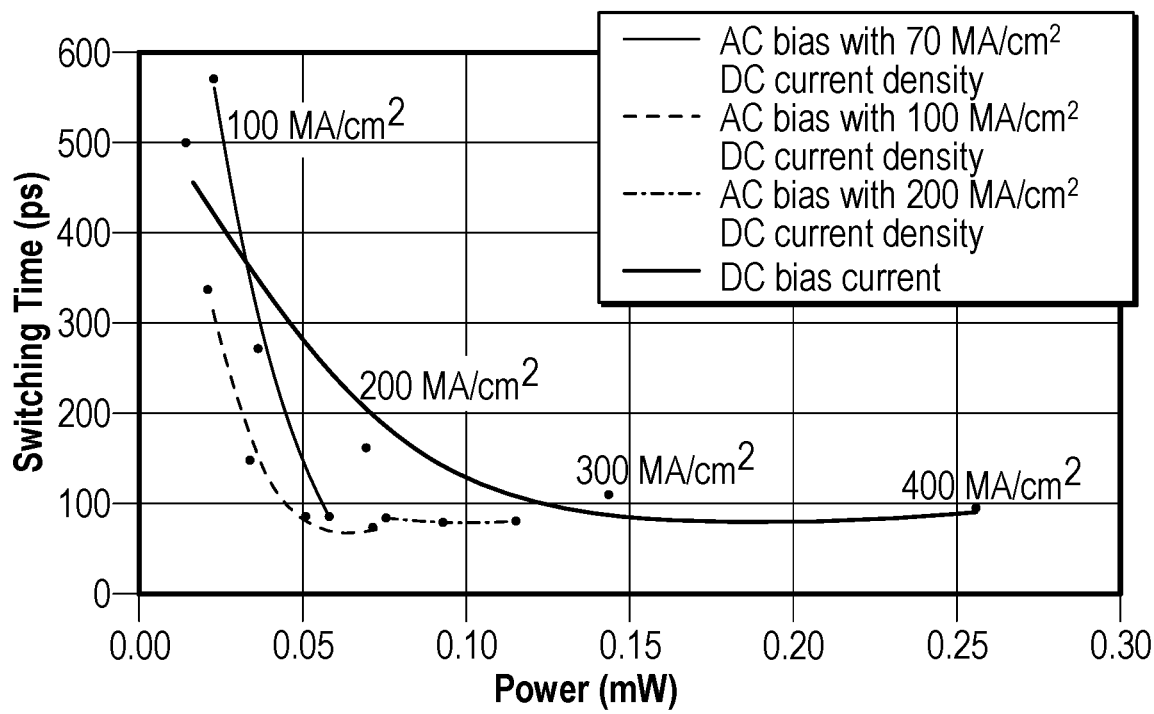
FIG. 17 illustrates the effect of using an AC bias current to improve the switching time of a free layer having a Bst value of 4.5 Tnm in accordance with some embodiments.

FIG. 17 illustrates the benefit of the bias current 160A shown in FIG. 13A on the switching time of a free layer having a Bst value of 4.5 Tnm. The thick solid curve is a curve fit to four data points illustrating the switching time of the free layer as a function of power when the bias current is simply DC (i.e., the bias current does not include the driving pulse 250). For convenience, the bias current densities for each of the points shown for the DC case are indicated on the plot. The thin solid curve is a curve fit to three data points illustrating the switching time of the free layer using the bias current 160A shown in FIG. 13A with a DC current density 205 of 70 MA/cm2 and various driving pulse amplitudes 215. The left-most data point, at approximately 0.02 mW power and 570 ps, corresponds to a driving pulse amplitude 215 of 140 MA/cm2. The middle data point on the thin solid curve, at approximately 0.03 mW and 275 ps, corresponds to a driving pulse amplitude 215 of 210 MA/cm2, and the right-most data point, at approximately 0.06 mW and 90 ps, corresponds to a driving pulse amplitude 215 of 280 MA/cm2.

The dashed curve of FIG. 17 is a curve fit to four data points illustrating the switching time of the free layer using the bias current 160A shown in FIG. 13A with a DC current density 205 of 100 MA/cm² and various driving pulse amplitudes 215. The left-most data point, at approximately 0.02 mW power and 340 ps, corresponds to a driving pulse amplitude 215 of 100 MA/cm². The second-to-the-left data point on the dashed curve, at approximately 0.035 mW and 150 ps, corresponds to a driving pulse amplitude 215 of 200 MA/cm². The second-to-the-right data point on the dashed curve, at approximately 0.05 mW and 90 ps, corresponds to a driving pulse amplitude 215 of 300 MA/cm², and the right-most data point, at approximately 0.07 mW and 75 ps, corresponds to a driving pulse amplitude 215 of 400 MA/cm².

The dash-dot curve is a curve fit to three data points illustrating the switching time of the free layer using the bias current 160A shown in FIG. 13A with a DC current density 205 of 200 MA/cm² and various driving pulse amplitudes 215. The left-most data point, at approximately 0.075 mW power and 90 ps, corresponds to a driving pulse amplitude 215 of 200 MA/cm². The middle data point on the dash-dot curve, at approximately 0.09 mW and 85 ps, corresponds to a driving pulse amplitude 215 of 400 MA/cm², and the right-most data point, at approximately 1.15 mW and 85 ps, corresponds to a driving pulse amplitude 215 of 600 MA/cm².

The benefits of using a bias current 160 with a driving pulse 250 are evident from FIG. 17, which indicates that the use of a bias current 160 with a driving pulse 250 can reduce free layer switching time for a selected power constraint. For example, if the maximum power available is 0.05 mW, the use of the bias current 160A with a DC current density of 70 MA/cm² and a driving pulse amplitude 215 less than 140 MA/cm² reduces the free layer switching time from around 280 ps using only a DC bias current to approximately 150 ps. Alternatively, a specified switching time can be achieved with less power. For example, if it is desirable for the switching time to be less than 100 ps, approximately 0.125 mW power is necessary with a DC bias current. In contrast, the amount of power required is around 0.055 mW using the bias current 160A shown in FIG. 13A with a DC current density 205 of 70 MA/cm² and a driving pulse amplitude 215 of 280 MA/cm2. Similarly, the amount of power required is less than 0.05 mW using the bias current 160A shown in FIG. 13A with a DC current density 205 of 100 MA/cm² and a driving pulse amplitude 215 of 300 MA/cm².

Figure 18:
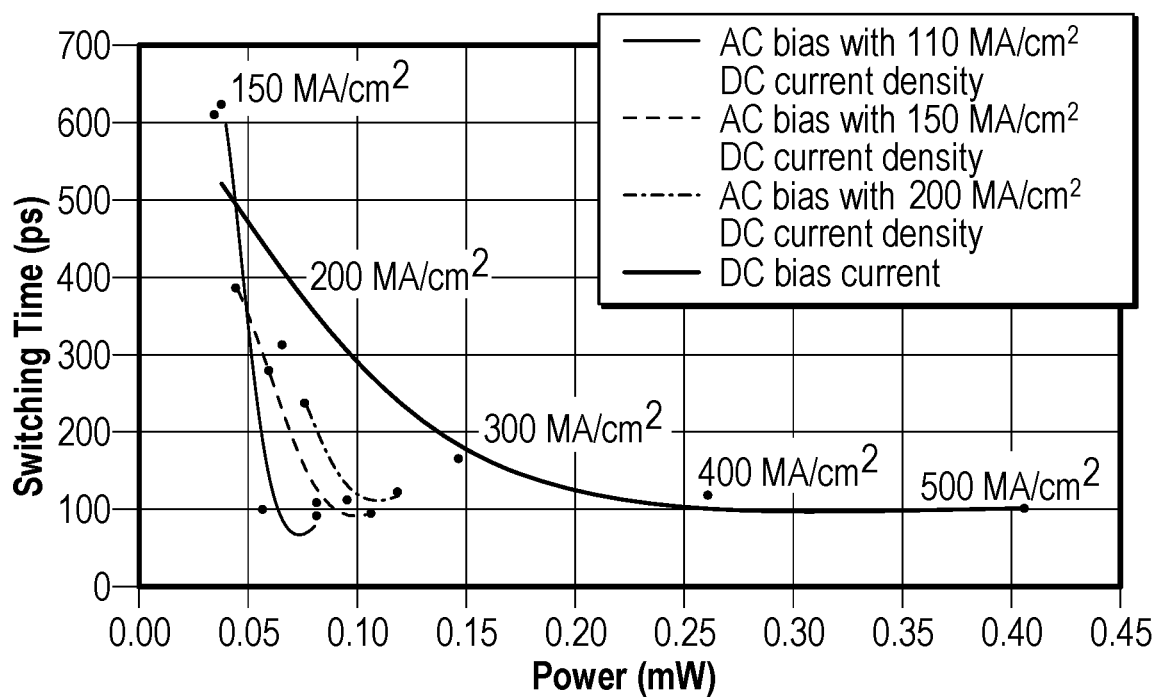
FIG. 18 illustrates the effect of using an AC bias current to improve the switching time of a free layer having a Bst value of 6.5 Tnm in accordance with some embodiments.

FIG. 18 illustrates the benefit of the bias current 160A shown in FIG. 13A on the switching time of a free layer having a Bst value of 6.5 Tnm. The thick solid curve is a curve fit to four data points illustrating the switching time of the free layer as a function of power when the bias current is simply DC (i.e., the bias current does not include the driving pulse 250). For convenience, the bias current densities for each of the points shown for the DC case are indicated on the plot. The thin solid curve is a curve fit to three data points illustrating the switching time of the free layer using the bias current 160A shown in FIG. 13A with a DC current density 205 of 110 MA/cm² and various driving pulse amplitudes 215. The left-most data point, at approximately 0.04 mW power and 625 ps, corresponds to a driving pulse amplitude 215 of 330 MA/cm². The middle data point on the thin solid curve, at approximately 0.055 mW and 100 ps, corresponds to a driving pulse amplitude

215 of 440 MA/cm$^2$, and the right-most data point, at approximately 0.08 mW and 95 ps, corresponds to a driving pulse amplitude 215 of 550 MA/cm$^2$.

The dashed curve of FIG. 18 is a curve fit to four data points illustrating the switching time of the free layer using the bias current 160A shown in FIG. 13A with a DC current density 205 of 150 MA/cm$^2$ and various driving pulse amplitudes 215. The left-most data point, at approximately 0.045 mW power and 390 ps, corresponds to a driving pulse amplitude 215 of 300 MA/cm$^2$. The second-to-the-left data point on the dashed curve, at approximately 0.06 mW and 285 ps, corresponds to a driving pulse amplitude 215 of 450 MA/cm$^2$. The second-to-the-right data point on the dashed curve, at approximately 0.08 mW and 105 ps, corresponds to a driving pulse amplitude 215 of 600 MA/cm$^2$, and the right-most data point, at approximately 0.105 mW and 95 ps, corresponds to a driving pulse amplitude 215 of 750 MA/cm$^2$.

The dash-dot curve is a curve fit to three data points illustrating the switching time of the free layer using the bias current 160A shown in FIG. 13A with a DC current density 205 of 200 MA/cm$^2$ and various driving pulse amplitudes 215. The left-most data point, at approximately 0.0075 mW power and 230 ps, corresponds to a driving pulse amplitude 215 of 400 MA/cm$^2$. The middle data point on the dash-dot curve, at approximately 0.095 mW and 105 ps, corresponds to a driving pulse amplitude 215 of 600 MA/cm$^2$, and the right-most data point, at approximately 1.2 mW and 115 ps, corresponds to a driving pulse amplitude 215 of 800 MA/cm$^2$.

The benefits of using a bias current 160 with a driving pulse 250 to improve the switching time of the free layer are also confirmed in FIG. 18. Like FIG. 17, FIG. 18 indicates that the use of a bias current 160 with a driving pulse 250 can reduce free layer switching time for a selected power constraint, or a specified switching time can be achieved with less power. For a free layer with a Bst value of 6.5 Tnm, a pulse duration 220 of 200 ps did not provide optimal results. Thus, the duration 220 may need to exceed 200 ps for free layers with higher Bst values.

Figure 19:
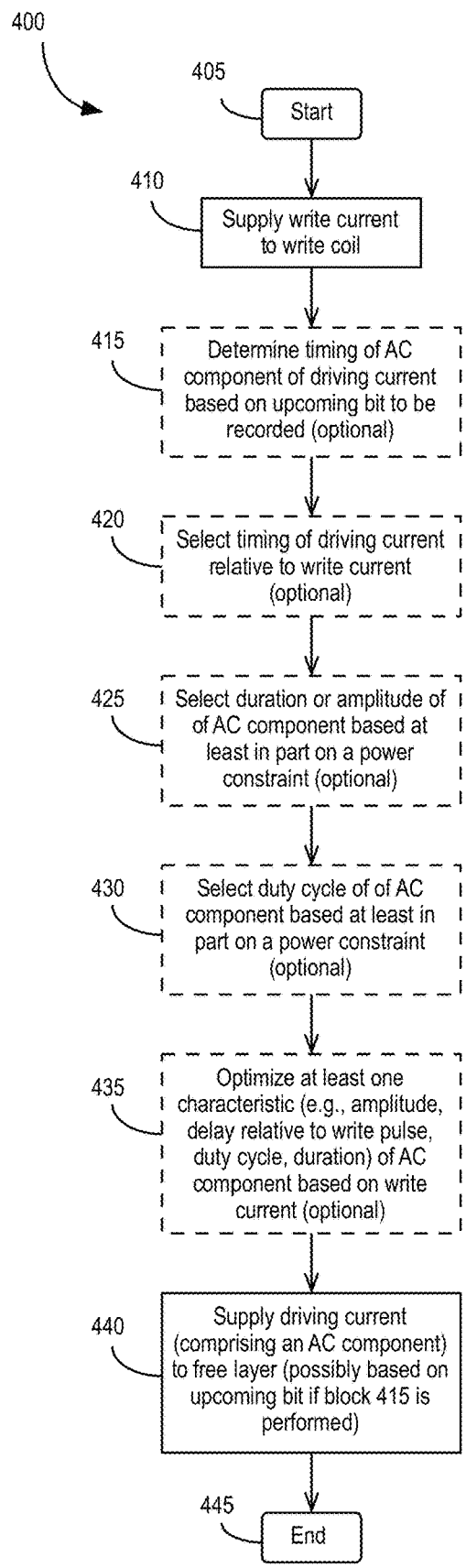
FIG. 19 is a flowchart of a method of writing to a magnetic medium in accordance with some embodiments.

FIG. 19 is a flowchart 400 that illustrates a method of writing to a magnetic medium in accordance with some embodiments. At block 405, the method begins. At block 410, a write current is supplied to a write coil. The write current may include a write pulse, as discussed elsewhere herein. At optional block 415, the timing of an AC component of a driving current to be supplied to a free layer is optionally determined. The determination may be based, for example, on an upcoming bit to be recorded. As explained elsewhere, the timing may be a delay relative to the write current or relative to a write pulse of the write current. At optional block 420, the timing of the overall driving current, comprising both the AC component and a DC component, relative to the write current may optionally be selected. At optional block 425, a duration and/or an amplitude of the AC component of the driving current may optionally be selected. The duration and/or amplitude may be selected based at least in part on a power constraint. At optional block 430, a duty cycle may be selected for the AC component. The duty cycle may be selected based at least in part on a power constraint. At optional block 435, at least one characteristic of the AC component may optionally be optimized based on the write current. The characteristic may be one or more of the amplitude, a delay relative to a write pulse of the write current, a duty cycle, or a duration. At block 430, the driving current, which comprises an AC component, is supplied to the free layer. If optional block 415 has been performed, the driving current may be supplied to the free layer based on the upcoming bit. At block 445, the method ends.

It is to be appreciated that although the blocks of FIG. 19 are presented in a particular order, that presentation is for convenience and does not necessarily indicate that the blocks are performed in the illustrated order. At least some of the blocks may be performed in other orders, and some of the blocks may be performed at the same time or jointly. For example, the optional blocks 415, 420, 425, 430, and 435 may be performed, if at all, in a different order (e.g., the duty cycle of the AC component, if selected at all, may be selected before or at the same time as the duration or amplitude of the AC component). As another example, block 410 may be performed before, after, or at the same time as block 440. Likewise, some or all of the optional blocks 415, 420, 425, 430, and 435 may be performed together, such as in a joint optimization (e.g., the timing, duration, amplitude, and/or duty cycle of the AC component may be determined in a joint optimization procedure that may be based on, for example, a power constraint).

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used herein, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. An apparatus for writing to a magnetic medium, the apparatus comprising:
    a main pole;
    a trailing shield;
    a write-field-enhancing structure disposed within a write gap between the main pole and the trailing shield, the write-field-enhancing structure comprising:
        a spacer disposed between the main pole and the trailing shield, wherein the spacer is non-magnetic,
        a non-magnetic layer disposed between the main pole and the trailing shield, and
        a free layer adjacent to the spacer and disposed between the spacer and the non-magnetic layer, wherein the free layer is magnetic;
    a write coil configured to magnetize the main pole;
    a write current control circuit configured to supply a write current to the write coil to record a bit to a magnetic medium, wherein the write current comprises a write pulse; and
    a driving current control circuit configured to supply a driving current to the write-field-enhancing structure, wherein the driving current comprises a driving pulse, and wherein the driving current comprises an AC component with a duty cycle selected based at least in part on a power constraint.

2. The apparatus recited in claim 1, wherein the driving pulse is delayed by an amount of time relative to the write pulse.

3. The apparatus recited in claim 2, wherein the amount of time is less than approximately 500 picoseconds.

4. The apparatus recited in claim 1, wherein a timing of the driving pulse is based on a timing of the write pulse.

5. The apparatus recited in claim 1, wherein a duration of the driving pulse is greater than zero and less than approximately 500 picoseconds.

6. The apparatus recited in claim 1, wherein the driving pulse has at least two non-zero amplitudes.

7. The apparatus recited in claim 1, wherein the driving current control circuit is further configured to adjust at least one characteristic of the driving pulse based on the write current or based on an upcoming bit to be recorded.

8. The apparatus recited in claim 7, wherein the at least one characteristic of the driving pulse comprises an amplitude, a delay relative to the write pulse, or a duration.

9. The apparatus recited in claim 1, wherein the driving current further comprises an advance pulse preceding the driving pulse.

10. The apparatus recited in claim 9, wherein an amplitude of the advance pulse is less than an amplitude of the driving pulse, or less than or equal to zero.

11. The apparatus recited in claim 9, wherein the driving current control circuit is further configured to adjust at least one characteristic of the advance pulse based on the write current or based on an upcoming bit to be recorded.

12. The apparatus recited in claim 11, wherein the at least one characteristic of the advance pulse comprises an amplitude, a delay relative to the write pulse, or a duration.

13. The apparatus recited in claim 1, wherein the free layer is the only magnetic layer within the write gap that is not adjacent to the main pole or the trailing shield.

14. A data storage device, comprising:
    the apparatus recited in claim 1; and
    the magnetic medium.

15. An apparatus for writing to a magnetic medium, the apparatus comprising:
    means for supplying a write current to a write coil of a magnetic write head;
    means for supplying a driving current to a free layer disposed in a write gap between a main pole and a trailing shield of the magnetic write head, wherein the driving current comprises an AC component; and
    means for selecting a duty cycle of the AC component based at least in part on a power constraint.

16. The apparatus recited in claim 15, further comprising:
    means for determining a timing of the AC component based on an upcoming bit to be recorded on the magnetic medium,
    and wherein the means for supplying the driving current to the free layer are configured to supply the driving current to the free layer based on the upcoming bit.

17. The apparatus recited in claim 15, further comprising:
    means for selecting a timing of the driving current relative to the write current.

18. The apparatus recited in claim 15, further comprising:
    means for selecting a duration or amplitude of the AC component based at least in part on the power constraint.

19. The apparatus recited in claim 15, wherein the AC component comprises an advance pulse and a driving pulse, wherein the advance pulse precedes the driving pulse.

20. The apparatus recited in claim 19, wherein an amplitude of the advance pulse is less than an amplitude of the driving pulse, or less than or equal to zero.

21. The apparatus recited in claim 15, further comprising:
    means for optimizing at least one characteristic of the AC component based on the write current, wherein the at least one characteristic comprises an amplitude, a delay relative to a write pulse of the write current, the duty cycle, or a duration.

22. The apparatus recited in claim 15, wherein the free layer is the only magnetic layer within the write gap that is not adjacent to the main pole or the trailing shield of the magnetic write head.

23. An apparatus for writing to a magnetic medium, the apparatus comprising:
    means for supplying a write current to a write coil of a magnetic write head; and
    means for supplying a driving current to a free layer disposed in a write gap between a main pole and a trailing shield of the magnetic write head, wherein the driving current comprises an AC component with a duty cycle selected based at least in part on a power constraint.

* * * * *